(12) United States Patent
Gabaudan

(10) Patent No.: US 10,328,875 B2
(45) Date of Patent: Jun. 25, 2019

(54) METHOD AND DEVICE FOR MANAGING VEHICLE LOADING

(71) Applicant: LDL TECHNOLOGY SAS, Ramonville Saint Agne (FR)

(72) Inventor: Paul Gabaudan, Sete (FR)

(73) Assignee: LDL TECHNOLOGY SAS, Ramonville Saint Agne (FR)

( * ) Notice: Subject to any disclaimer, the term of this patent is extended or adjusted under 35 U.S.C. 154(b) by 82 days.

(21) Appl. No.: 15/607,579

(22) Filed: May 29, 2017

(65) Prior Publication Data

US 2017/0349120 A1 Dec. 7, 2017

(30) Foreign Application Priority Data

Jun. 1, 2016 (FR) .................................... 16 54955

(51) Int. Cl.
| | |
|---|---|
| *B60R 16/023* | (2006.01) |
| *B60C 23/04* | (2006.01) |
| *B60C 23/00* | (2006.01) |
| *B62D 53/06* | (2006.01) |
| *G01G 19/08* | (2006.01) |

(52) U.S. Cl.
CPC ............ *B60R 16/023* (2013.01); *B60C 23/00* (2013.01); *B60C 23/04* (2013.01); *B60C 23/0437* (2013.01); *B62D 53/06* (2013.01); *G01G 19/08* (2013.01)

(58) Field of Classification Search
None
See application file for complete search history.

(56) References Cited

U.S. PATENT DOCUMENTS

| | | | |
|---|---|---|---|
| 2002/0019685 A1 | 2/2002 | Ries-Mueller | |
| 2016/0236523 A1 | 8/2016 | Moreau | |
| 2016/0349219 A1* | 12/2016 | Paturle | ................... B60C 23/00 |

FOREIGN PATENT DOCUMENTS

| | | |
|---|---|---|
| DE | 10029282 1 A | 12/2001 |
| DE | 2020009011330 U1 | 11/2009 |
| DE | 102010047820 A1 | 5/2011 |
| WO | 2015052439 A1 | 4/2015 |

OTHER PUBLICATIONS

Alain Gaillard, Institute National de la Propriete Industrielle, Preliminary Search Report, Application FR 1654955, dated Mar. 6, 2017.

* cited by examiner

*Primary Examiner* — Richard M Camby
(74) *Attorney, Agent, or Firm* — Paul & Paul

(57) ABSTRACT

The invention concerns a method for managing the load of a vehicle (C) of the type of that equipped with at least one module for transmitting data (110, 120, 130) through radiofrequency signals (F1, F2, F3) and one module for receiving (120, 220) data from the transmission module, said vehicle (C) and the different modules being disposed so that the load, once present, has an impact on the propagation of the radiofrequency signal,
remarkable in that it comprises the following operation:
detection of the variation of the spectral signature of the signal received (F2') by the receiving module (120, 220), in order to detect variations, in particular corresponding to the presence and/or absence of a load (600).
The invention also concerns the device enabling said method to be implemented.

20 Claims, 2 Drawing Sheets

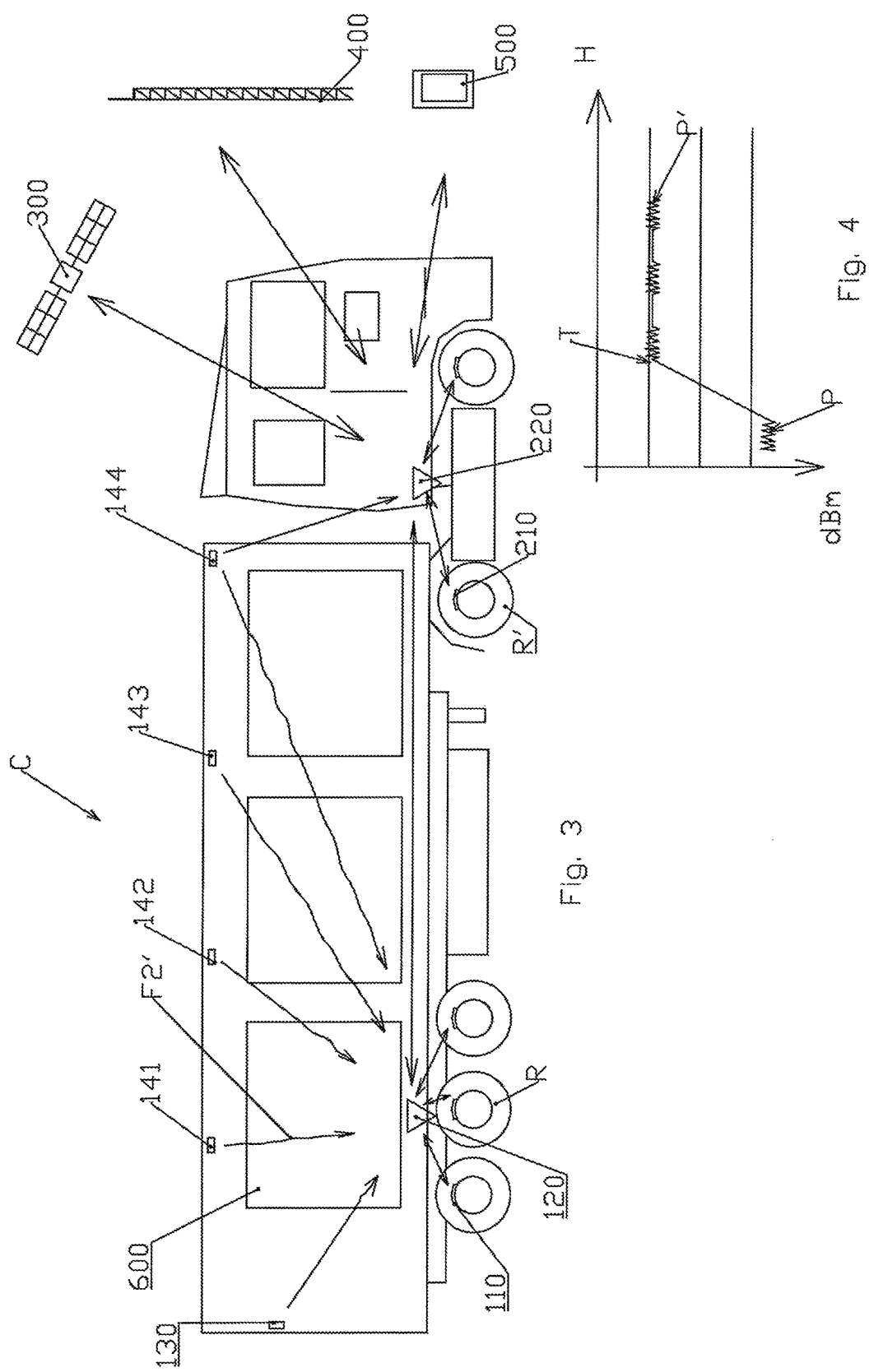

METHOD AND DEVICE FOR MANAGING VEHICLE LOADING

SCOPE OF THE INVENTION

This invention concerns the area of onboard electronics and, in particular, adaptations enabling the entries and exits of a load in a vehicle to be managed under the best conditions.

DESCRIPTION OF THE PRIOR ART

Today, vehicles are equipped with multiple pieces of electronic equipment that take measurements.

Thus, for example, it is known to place pressure sensors and/or temperature sensors inside the tyre chamber. Through the parameters monitored, these sensors offer increased safety and increased fuel saving, as they do on wear and tear on tyres. Classically, these sensors placed in the tyre chambers are equipped with a transmission module communicating through radiofrequency with a receiving and transmission unit disposed in the vehicle.

Similar, self-supplying sensors, communicating through radiofrequency, can be placed in other strategic places. For example, in a refrigerated transport vehicle, temperature and humidity sensors monitoring the cold chain are placed in the refrigerated chamber.

Each sensor has a unique identifier number, enabling it to be identified from amongst the other sensors present in the vehicle or present in other vehicles in circulation. This unique identifier number enables the receiving and transmission unit of the vehicle to identify its equipment.

There are also methods such as the one described in document FR3011770 which consists of installing on each rolling subassembly, an additional storage and communication module which, without compulsorily measuring a parameter, communicates with the receiving and transmission modules, so that said storage and communication module can hold all identifiers and locations connected with the same subassembly in its memory, and can communicate this instantaneously to the vehicle's receiving and transmission units.

Other sensors can be connected with the door wings controlling access to said chamber, in a way to make sure they are closed correctly.

Only these door sensors can indicate to the Fleet Manager, if a shipment is potentially loaded. However, it is understood that the simple detection of the opening or closing of the door does not guarantee the presence of goods.

In order to be able to have such information, it is known to use loading sensors such as piezoelectric technology sensors, likely to be positioned, either in the tyres or in the vehicle's suspension. However, the precision of piezoelectric sensors present in the tyres, by having a tolerance of one to two tonnes, is not satisfactory. In addition, the installation of the mass sensors on the suspension is particularly expensive.

In order to detect, measure, correlate the presence of goods, or correlate a load in a vehicle, it is also known to detect, by means of pressure sensors described above, a variation in tyre pressure. The vehicle load has an impact on the tyre pressure. Consequently, the content of the information transmitted by the wheel sensors varies and increases, because of the change in pressure. This measured data can be compared with reference pressure data, and connected with axle load data, to make sure of its presence, to measure the load. Examples of such methods are described in documents DE202009011330, DE10029282 and DE102010047820.

In practice, the pressure increases very little, and classically used pressure sensors do not have the necessary pressure. In addition, a minimum variation in pressure can have causes, other than the presence or absence of a load. These methods therefore only have relative effectiveness. Finally, the methods described in these documents, by being based on the sole criterion of the load, are not able to give it precision regarding the type of this load.

DESCRIPTION OF THE INVENTION

This noted, the applicant has carried out research aiming to propose a technical estimation solution for managing the load of a vehicle without the disadvantages of the prior art.

This research has resulted in the design and the fulfillment of a method and a device for managing the load of a vehicle, both precise and not very expensive, thus countering the aforementioned disadvantages.

According to the invention, the method for managing the load of a vehicle of the type of that equipped with at least one data transmission module, transmitting data through radiofrequency signals and a module for receiving data from the transmission module, said vehicle and the different modules being disposed, so that the load, once present, has an impact on the propagation of the radiofrequency signal, is remarkable in that it comprises the following operation:
  detection of the variation of the spectral signature of the signal received by the receiving module, in order to detect variations, in particular corresponding to the presence and/or absence of a load.

The invention is based on the variation of the signal's propagation channel, which modifies the spectral signature of the signal emitted by the sensor according to whether the load is present or absent, or of a different type.

The variation in the spectral signature of the signal will therefore give information to a load in the storage volume, wherein the communication signals of the sensor networks taking measurements are propagated. The detection of variation can be made in addition, and can be correlated to opening/closing signals coming from dedicated sensors, with which the vehicle would possibly be equipped.

The method of the invention is therefore particularly beneficial, in that it has information enabling it to know of any load inside the vehicle without requiring particularly expensive equipment. This information can be transmitted to the driver and/or a Fleet Manager. In addition, it enables the already-existing and already-installed equipment to be operated, in a new way. It additionally enables any intrusion in the useful volume monitored to be detected, an intrusion which, if it does go through the doors, or if the door sensors are neutralised, cannot be detected.

The different type of load can be detected, because depending on the load, the propagation of the radio signal is not modified in the same way. Indeed, for example, at an equal mass, a load, whether a feather or lead, does not constitute the same obstacle to the propagation of the signal. The process material of the method of the invention is the signal itself, as well as the variations of the signal induced by the presence or absence of a load, by the type and change in load type. The method of the invention therefore proposes the detection of a variation in the load, which could go beyond the simple variation in weight or in volume.

According to another particularly beneficial characteristic of the invention, the method additionally comprises the following operation:

measurement of the spectral signature of the signal received by the receiving module.

This measurement enables the supplying of data going beyond the simple presence or absence of a load. It will thus enable the increase in the load to be detected, in other words, in its loading and in its partial unloading. The method of the invention equally operates in detecting the variation and its type. Thus, the method of the invention brings a solution for monitoring the increase in load.

In addition, according to the type of load and its position in relation to the transmission modules and the receiving modules, the variation in signal is different and can be identified.

According to another particularly beneficial characteristic of the invention, the method of the invention additionally comprises the following operations:

measurement of the variation in the spectral signature of the signal,
identification of the cause of said variation,
creation of a database connecting the variation measured to the cause of said variation.

The systematic measurement and identification enable the creation of a map of measurements in variations for each vehicle. Thus, according to the measurement obtained, the driver and/or the Fleet Manager, identify the type of the event causing the variation, and make the correlation with the operations provided for the vehicle.

Any non-identified variation, or any variation not corresponding to the operation provided needs to be checked.

According to another particularly beneficial characteristic of the invention, the method measures the power of the signal received. This spectral signature parameter can easily be measured on the receiving module.

According to another particularly beneficial characteristic of the invention, the method comprises the storing of spectral signatures received, according to the type of load in a way to create, for the vehicle, a database making the link between a signal spectral signature received and the type of load.

For example, when the parameter measured is power, a shipment of high-water-content dairy products does not have the same impact on the transmission power as it does on a shipment of glass wool. The monitoring proposed by the invention thus enables the load to be recognised. The invention enables an analysis giving a reliable representation of the load status of said vehicle to be obtained. It also enables for one same vehicle to separately monitor several chambers or compartments containing loads of different types.

According to another particularly beneficial characteristic of the invention, the method is remarkable, in that the transmission is constituted by the transmission modules of onboard sensors in the vehicle, and that the receiving module is constituted by the receiver of data measured by the sensors. Thus, a device implementing the method of the invention is constituted by the already-existing installation of sensors and receivers installed in the vehicle. The method of the invention can therefore be implemented, adding an additional function to the receiver, for the purpose of measuring the spectral signature (or the power when the parameter measured is power) of the signals received from the sensors.

With this information, the Fleet Manager, who had information from the sensors, can additionally effectively observe the loading or unloading of the vehicle in real time, by having the functioning frequency of said sensors. They can also have the information linked to the load type or a possible intrusion.

Another practical case solved by the invention, resides in the incorrect loading of goods in a refrigerated compartment. Indeed, the refrigerated chambers of lorries are often multi-chambers, which are not all at the same temperature. During unloading or shifting loads, chamber reversals often come about in error, which leads to the loss of food. The invention, by enabling the temperature to be correlated, the opening of chambers, the presence of the load and its type, avoids this type of error.

According to another particularly beneficial characteristic of the invention, the method is remarkable, in that the transmission module and the receiving module are positioned in relation to the storage area of the vehicle, so that the load, once present, is physically placed into the signal propagation channel. The method of the invention thus induces a new way of disposing sensors and/or their receivers, in a way to promote this new function. According to a preferred, but not exhaustive embodiment, a temperature sensor (and consequently its transmission module) is disposed in the upper part of the load volume of the lorry, so that the signal propagation channel is systematically affected by any change in said volume.

This physical placement of the load is preferable, but not compulsory, because even without placement, the present or variation in load can have an impact on the spectral signature of a radio signal.

According to another particularly beneficial characteristic of the invention, the method is remarkable, in that it comprises the following operation:

Modifying the sensors and/or the transmission modules, so that they also have a receiving function, each sensor and/or transmission module can then measure the signal from other sensors and/or other transmission modules in the network, or that of the consequently-equipped receiver module. Such a characteristic enables better precision in measuring the variation of the spectral signature of the signal. Indeed, the spectral signature of two signals for two modules can then be obtained, in a way to create an average value, less dependent on the effects of deviation and guiding radio waves through walls constituting the trailer chamber, for example.

According to another particularly beneficial characteristic of the invention, the method is remarkable, in that it comprises the following operation:

Integrating two polarisations in each system element, in order to carry out a first measurement of vertical polarisation, and a second measurement of horizontal polarisation for each system node. Such a characteristic enables disturbances in measurements linked to wave guides created by the chamber to be limited.

According to another particularly beneficial characteristic of the invention, in order to facilitate the communication and identification of the signals transmitted by the sensors connected to each rolling subassembly, the method is remarkable, in that it comprises the following operation:

inscription in the memory of each sensor, of the unique identifier of the receiver to which the sensor must transmit data.

Communication is thus optimised, since there are no longer receivers which recognise signals from sensors via a long learning phase, but the sensors which know the unique identifier of the receiver to which they send the data measured. This better identification contributes to a better implementation of the method of managing the load, in that it avoids confusion between the transmission sources, particularly when two vehicles are side-by-side.

Another object of the invention is the device enabling the method to be implemented. This device is remarkable, in that it comprises:
- at least one sensor installed on a given vehicle, equipped with a transmission module of data measured through radiofrequencies,
- at least one receiving/transmission unit of said data connected to a vehicle network and equipped with a means of measuring the spectral signature of the signal received.

It is thus understood, that all or part of the method can be implemented by any transmission/receiving installation already present in the vehicle, of which the spectral signature of the signal is likely to be modified by the presence or absence of the load. According to another particularly beneficial characteristic of the invention, the receiving/transmission unit of said data is equipped with a means for measuring the power of the signal received.

According to a preferred but not exhaustive embodiment, the means for measuring the power of the signal received is implemented through dedicated software integrated into the functioning of the receiving/transmission unit.

The fundamental concepts of the invention shown above in their most basic form, other details and characteristics will emerge more clearly in reading the description which follows, and by looking through the appended drawings, giving as a non-exhaustive example, an embodiment that conforms with the invention.

BRIEF DESCRIPTION OF THE DRAWINGS

FIG. 3 is a schematic drawing of the vehicle from FIG. 1 with a load;
FIG. 4 is a graphic illustrating the measurement of power from the signal received with a load.

DESCRIPTION OF A PREFERRED EMBODIMENT

Figures 1, 2:
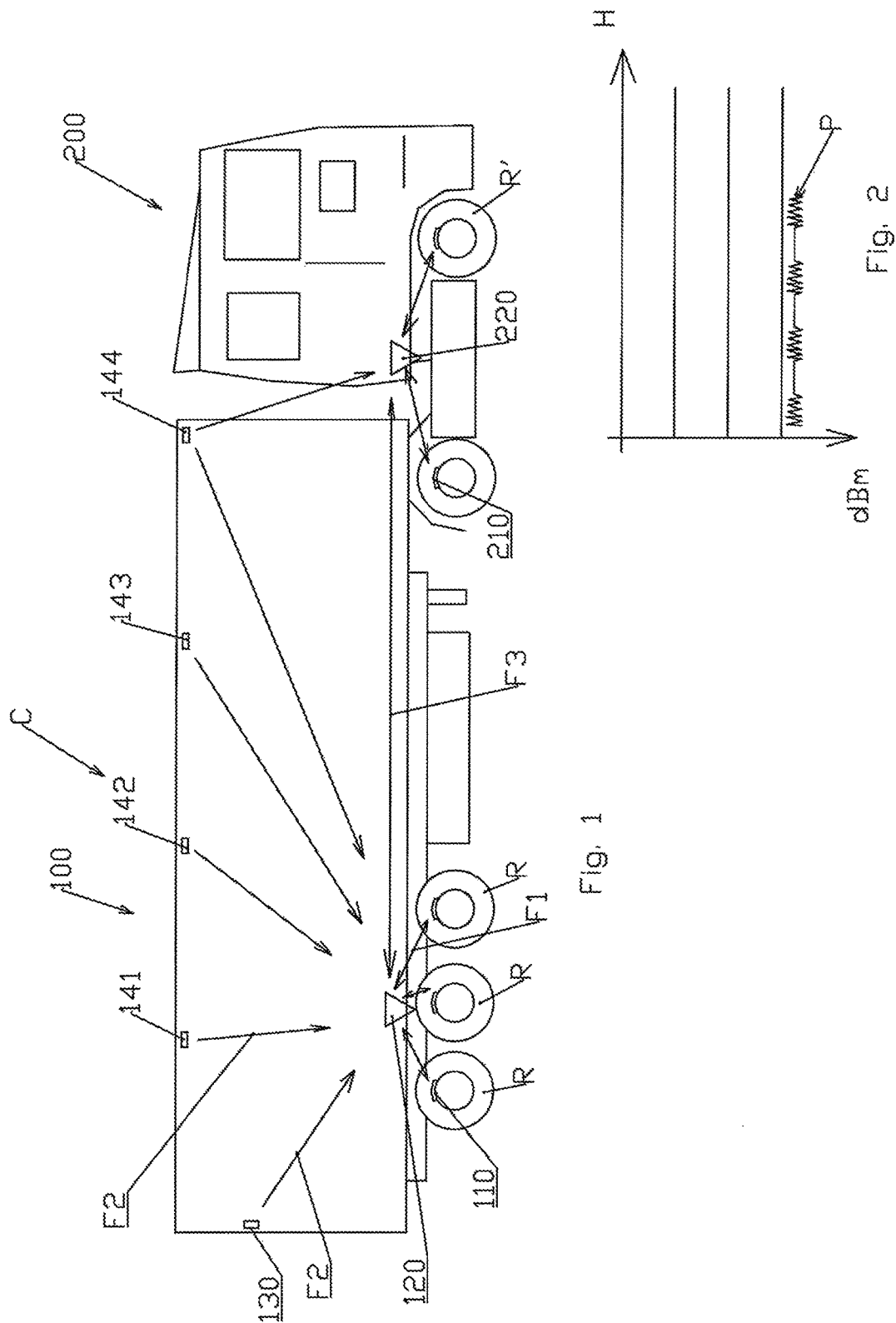
FIG. 1 is a schematic drawing of a trailer and its lorry with no load.
FIG. 2 is a graphic illustrating the measurement of power from the signal received.

As illustrated in the drawings in FIGS. 1 and 3, the lorry referenced C in its entirety comprises a trailer 100 and a tractor 200. The trailer 100 is equipped with wheels R in the tyres, from which the wheel sensors 110 measure the temperature and/or the pressure for the purpose of monitoring the pressure of the tyres. The tractor 200 is equipped with a wheel R' in the tyres, from which the wheel sensors 210 measure the temperature and/or the pressure for the purpose of monitoring the pressure of the tyres.

The trailer 100 is additionally equipped with a unit 120 for receiving and transmitting signals sent by the sensors 110 of the wheels R of the trailer 100. For this purpose, each sensor 110 is equipped with a transmission module of a radiofrequency signal F1 to send the data measured, in a regular, stable and unidirectional way, to the unit 120.

According to the non-exhaustive embodiment illustrated, the trailer 100 is the refrigerated type, and additionally comprises:
- a door sensor 130 detecting the opening of the door,
- four temperature sensors 141, 142, 143, 144 disposed in different places inside the receiving volume of the load of the trailer 100.

These door sensors 130 and temperature sensors 141, 142, 143, 144 also communicate with the receiving and transmission unit 120 equipping the trailer 100 through radiofrequency signals F2 for unidirectional communication. The temperature sensors communicate in a regular and stable way.

The tractor 200 itself is equipped with a unit 220 for receiving and transmitting signals sent by the sensors 210 of the wheels R' through radiofrequencies. This unit 220 connected to the tractor 200 communicates in a two-directional connection F3 with the unit 120 connected to the trailer 100. It also ensures the regular transmission of data to the network of the lorry C and/or to the outside to a satellite 300, a relay antenna 400 or trigger 500.

These different subassemblies communicate through radiofrequencies. The invention operates the chain of onboard sensors in the trailer 100 in a new and particularly sound way, by making it implement a new function, namely the detection of the vehicle load in a precise and less costly way. To do this, the receiving and transmission unit will detect the variation in power of the radiofrequency signal received.

This new function appears during the loading of the lorry C illustrated by the drawing in FIG. 3 and in the change coming about in the power measured, a change illustrated by going from the drawing in FIG. 2 to the drawing in FIG. 4.

As illustrated in the drawing in FIG. 2, the power P on the Y-axis is measured in dBm (relationship of power in decibels between the power measures and a milliwatt) is constant over time (on the X-axis), whereas the receiving volume of the trailer load remains void.

When, as illustrated in the drawing in FIG. 3, a load comes to occupy the receiving volume of the trailer 100, the radiofrequency signal F2 sent, for example, by the sensor 141 to the receiving unit for the purpose of the constant monitoring of the temperature sees its power change because of the presence of the container 600. Thus, as illustrated by the drawing in FIG. 4, the power goes from P to P' at an instant T, corresponding to the sending of the radiofrequency signal from the sensor 141 once the load is achieved.

This variation enables the presence of the load to be observed, information which can be relayed to the vehicle network via the receiving unit 220 of the tractor 200. This information can be correlated with the detection of the opening of the doors, detected by the sensor 130.

It is understood that the method and the device, which have just been described and represented above, have been so in view of a disclosure rather than a limitation. Of course, various arrangements, modifications and improvements can be applied to the example above, without moving away from the framework of the invention.

The invention claimed is:

1. Method of managing a load of a vehicle (C) of the type of that equipped with at least one module for transmitting data (110, 120, 130) through radiofrequency signals (F1, F2, F3) and one module for receiving (120, 220) data from the transmission module, said vehicle (C) and the different modules being disposed so that the load, once present, has an impact on the propagation of the radiofrequency signal, the radiofrequency signal having a spectral signature, CHARACTERISED IN THAT the method comprises the following operation:

detection of the variation of the spectral signature of the signal received (F2') by the receiving module (120, 220);
additionally comprising the following operation:
measurement of the spectral signature of the signal received (F2') by the receiving module (120, 220); and
further comprising
the storing of spectral signatures received depending on the type of load (600), in a way to create, for the vehicle (C), a database making the link between a signal spectral signature received and the type of load (600).

2. Method according to claim 1, CHARACTERISED IN THAT the method measures the power of the signal received (F2').

3. Device enabling the implementation of the method according to claim 1, CHARACTERISED IN THAT it comprises:
at least one sensor (110, 210, 141, 142, 143, 144) installed in a given vehicle (C), equipped with a module for transmitting data measured through radiofrequencies,
at least one receiving/transmission unit (120, 220) of said data connected to a vehicle (C) network and equipped with a means for measuring the spectral signature of the signal received.

4. Device according to claim 3, CHARACTERISED IN THAT the receiving/transmission unit (120, 220) of said data is equipped with a means for measuring the power of the signal received.

5. Method of managing a load of a vehicle (C) of the type of that equipped with at least one module for transmitting data (110, 120, 130) through radiofrequency signals (F1, F2, F3) and one module for receiving (120, 220) data from the transmission module, said vehicle (C) and the different modules being disposed so that the load, once present, has an impact on the propagation of the radiofrequency signal, the radiofrequency signal having a spectral signature,
CHARACTERISED IN THAT the method comprises the following operation:
detection of the variation of the spectral signature of the signal received (F2') by the receiving module (120, 220);
wherein the transmission module and the receiving module are positioned in relation to the storage area of the vehicle (C), so that the load (600), once present, is placed in the signal (F2') propagation channel.

6. Method according to claim 5, CHARACTERISED IN THAT the method measures the power of the signal received (F2').

7. Device enabling the implementation of the method according to claim 5, CHARACTERISED IN THAT it comprises:
at least one sensor (110, 210, 141, 142, 143, 144) installed in a given vehicle (C), equipped with a module for transmitting data measured through radiofrequencies,
at least one receiving/transmission unit (120, 220) of said data connected to a vehicle (C) network and equipped with a means for measuring the spectral signature of the signal received.

8. Device according to claim 7, CHARACTERISED IN THAT the receiving/transmission unit (120, 220) of said data is equipped with a means for measuring the power of the signal received.

9. Method of managing a load of a vehicle (C) of the type of that equipped with at least one module for transmitting data (110, 120, 130) through radiofrequency signals (F1, F2, F3) and one module for receiving (120, 220) data from the transmission module, said vehicle (C) and the different modules being disposed so that the load, once present, has an impact on the propagation of the radiofrequency signal, the radiofrequency signal having a spectral signature,
CHARACTERISED IN THAT the method comprises the following operation:
detection of the variation of the spectral signature of the signal received (F2') by the receiving module (120, 220);
where the vehicle (C) is equipped with sensors (110, 210, 141, 142, 143, 144) and receivers (120, 220), and the transmission module is constituted by transmission modules of onboard sensors (110, 210, 141, 142, 143, 144) in the vehicle (C), and that the receiving module (120, 220) is constituted by the receiver of data measured by the sensors (110, 210, 141, 142, 143, 144);
further comprising the following operation:
inscription in the memory of each sensor (110, 210, 141, 142, 143, 144), of the unique identifier of the receiver (120, 220) to which the sensor (110, 210, 141, 142, 143, 144) must transmit data.

10. Method according to claim 9, CHARACTERISED IN THAT the method measures the power of the signal received (F2').

11. Device enabling the implementation of the method according to claim 9, CHARACTERISED IN THAT it comprises:
at least one sensor (110, 210, 141, 142, 143, 144) installed in a given vehicle (C), equipped with a module for transmitting data measured through radiofrequencies,
at least one receiving/transmission unit (120, 220) of said data connected to a vehicle (C) network and equipped with a means for measuring the spectral signature of the signal received.

12. Device according to claim 11, CHARACTERISED IN THAT the receiving/transmission unit (120, 220) of said data is equipped with a means for measuring the power of the signal received.

13. Method of managing a load of a vehicle (C) of the type of that equipped with at least one module for transmitting data (110, 120, 130) through radiofrequency signals (F1, F2, F3) and one module for receiving (120, 220) data from the transmission module, said vehicle (C) and the different modules being disposed so that the load, once present, has an impact on the propagation of the radiofrequency signal, the radiofrequency signal having a spectral signature,
CHARACTERISED IN THAT it comprises the following operation:
detection of the variation of the spectral signature of the signal received (F2') by the receiving module (120, 220);
the method additionally comprising the following operations:
measurement of the variation of the spectral signature of the signal,
identification of the cause of said variation,
creation of a database connecting the variation measured to the cause of said variation.

14. Method according to claim 13, CHARACTERISED IN THAT the method measures the power of the signal received (F2').

15. Device enabling the implementation of the method according to claim 13, CHARACTERISED IN THAT it comprises:
at least one sensor (110, 210, 141, 142, 143, 144) installed in a given vehicle (C), equipped with a module for transmitting data measured through radiofrequencies, at least one receiving/transmission unit (120, 220) of said data connected to a vehicle (C) network and equipped with a means for measuring the spectral signature of the signal received.

16. Device according to claim 15, CHARACTERISED IN THAT the receiving/transmission unit (120, 220) of said data is equipped with a means for measuring the power of the signal received.

17. Method of managing a load of a vehicle (C) of the type of that equipped with at least one module for transmitting data (110, 120, 130) through radiofrequency signals (F1, F2, F3) and one module for receiving (120, 220) data from the transmission module, said vehicle (C) and the different modules being disposed so that the load, once present, has an impact on the propagation of the radiofrequency signal, the radiofrequency signal having a spectral signature, CHARACTERISED IN THAT it comprises the following operation:
- detection of the variation of the spectral signature of the signal received (F2') by the receiving module (120, 220);

the method further comprising the following operation:
- modifying the sensors (110, 210, 141, 142, 143, 144) and/or the transmission modules, so that they also have a receiving function, each sensor (110, 210, 141, 142, 143, 144) and/or transmission module could then measure the signal from other sensors (110, 210, 141, 142, 143, 144) and/or other transmission modules from the network or that of the consequently-equipped receiving module.

18. Method according to claim 17, CHARACTERISED IN THAT the method measures the power of the signal received (F2').

19. Device enabling the implementation of the method according to claim 17, CHARACTERISED IN THAT it comprises:
- at least one sensor (110, 210, 141, 142, 143, 144) installed in a given vehicle (C), equipped with a module for transmitting data measured through radiofrequencies,
- at least one receiving/transmission unit (120, 220) of said data connected to a vehicle (C) network and equipped with a means for measuring the spectral signature of the signal received.

20. Device according to claim 19, CHARACTERISED IN THAT the receiving/transmission unit (120, 220) of said data is equipped with a means for measuring the power of the signal received.

* * * * *